United States Patent [19]

Suovaniemi et al.

[11] 4,237,095

[45] Dec. 2, 1980

[54] TIP VESSEL FOR USE IN CONNECTION WITH A DOSAGE PIPETTE

[75] Inventors: Osmo A. Suovaniemi; Jukka Tervamäki; Aarre Kukka, Helsinki, all of Finland

[73] Assignee: Kommandiittiyhtio Finnpipette Osmo A. Suovaniemi, Helsinki, Finland

[21] Appl. No.: 31,940

[22] Filed: Apr. 20, 1979

[30] Foreign Application Priority Data

Apr. 25, 1978 [FI] Finland ............ 781282
Nov. 7, 1978 [FI] Finland ............ 783383

[51] Int. Cl.$^3$ ............ B01L 3/02; G01N 1/10; G01N 1/14

[52] U.S. Cl. ............ 422/100; 73/425.4 P; 73/425.6; 422/99

[58] Field of Search ............ 422/100, 99; 73/425.4 P, 425.6

[56] References Cited

U.S. PATENT DOCUMENTS

| | | | |
|---|---|---|---|
| 2,170,173 | 8/1939 | Wheatley | 422/100 X |
| 3,855,868 | 12/1974 | Sudvaniemi | 73/425.6 |

FOREIGN PATENT DOCUMENTS

| | | | |
|---|---|---|---|
| 902987 | 9/1945 | France | 73/425.4 P |
| 2700096 | 10/1977 | Fed. Rep. of Germany | 73/425.6 |

*Primary Examiner*—Barry S. Richman
*Attorney, Agent, or Firm*—Hopgood, Calimafde, Kalil, Blaustein & Lieberman

[57] ABSTRACT

A disposable pipette tip vessel intended for use in connection with a dosage pipette. The lowest point of the tip vessel has a hole for suction of the liquid to be pipetted into the tip vessel and, correspondingly, for emptying of the tip vessel of the liquid contained therein. In the bottom part of the tip vessel around the filling and emptying hole, a plane or gently conical bottom portion has been shaped so that the tip vessel is arranged so that, between subsequent dosage steps to be performed by means of the pipette, the tip vessel allows the air column to be sucked into the bottom part of the tip vessel to rise as an air bubble or as bubbles of air above the liquid in the tip vessel, whereby the liquid column is correspondingly lowered to the bottom of the tip vessel.

4 Claims, 6 Drawing Figures

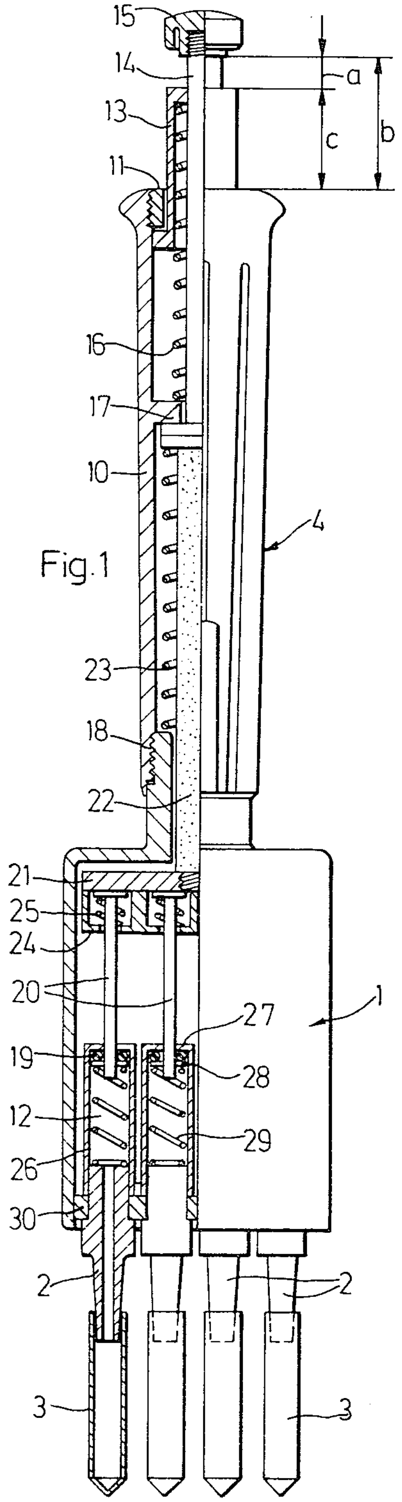
Fig. 1
Fig. 2
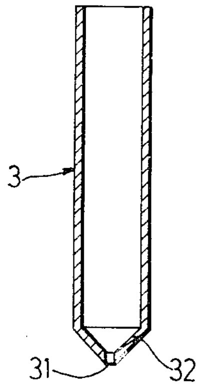
Fig. 3
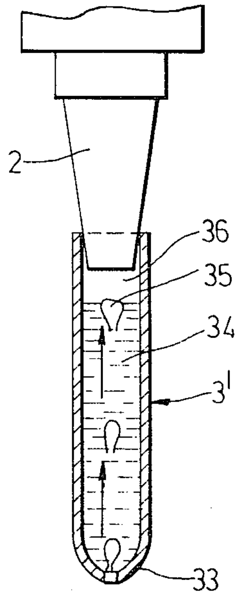

TIP VESSEL FOR USE IN CONNECTION WITH A DOSAGE PIPETTE

The subject of the present invention is a preferably disposable pipette tip vessel intended for use in connection with a dosage pipette, the upper part of said tip vessel being designed so that it can be connected, by means of a friction joint, to the lower part of the cylindrical portion of the pipette or of an extension of said cylindrical part and that the lowest point of the tip vessel is provided with a hole for suction of the liquid to be pipetted into the tip vessel and, correspondingly, for emptying the tip vessel of the liquid contained therein.

At present, there are pipettes for dosage purposes on the market by means of which pipettes it is possible to suck a large quantity of liquid, e.g. a reagent, into the tip vessels and to dose the liquid quickly and easily as minor subsequent quantities into different test tubes. Such pipettes have a complicated construction and consist of several pistons (per channel), or their operation is based on a stepwise movement of one piston. In order to produce the step, some mechanism is required, which makes the construction even more complicated.

Dosage would of course be otherwise possible by means of pipettes of simple construction as well, but the tip vessels of pipettes in use at present constitute an obstacle for this, for when dosage is performed by "pumping", i.e. when the operating knob is pressed down to the desired volume, which volume can be determined by means of various types of stops, and when the operating knob is raised up inbetween, air is always sucked into the lower portion of the tip vessel inbetween. Tapering thin tip vessels, which is the type of all the tip vessels on the market, cause the circumstance that after the first dosage step the liquid in the tip vessel moves up and down in the tip vessel owing to the influence of the suction and pressure, because the liquid column does not let the air quantity to be sucked into the lower part of the tip vessel pass by the liquid column between the dosage steps.

The object of the present invention is to provide a tip vessel by whose use it is possible to perform subsequent liquid dosages by means of a dosage pipette of a very simple construction.

The principal characteristics of the tip vessel in accordance with the present invention come out from the patent claims.

Figure 4:
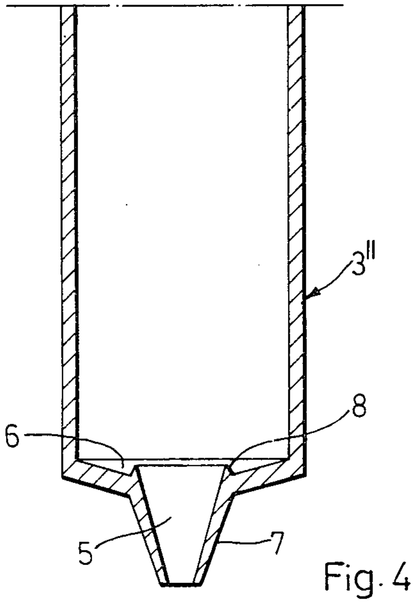
Figure 5:
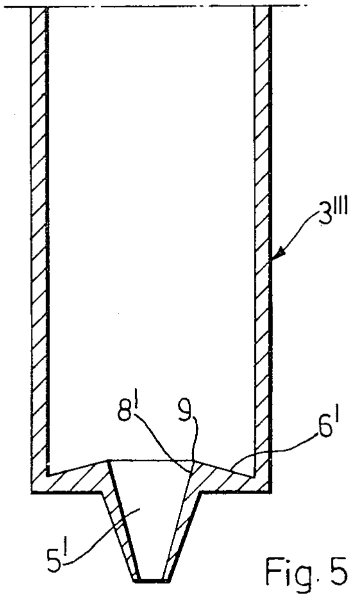

The invention comes out more closely from the following description and from the attached drawings, wherein FIG. 1 is a side view, one half as section, of a multichannel dosage pipette of a simple construction provided with tip vessels in accordance with the present invention, FIG. 2 is a side view in section of a tip vessel in accordance with FIG. 1 as enlarged, FIG. 3 is a side view in section of a tip vessel embodiment alternative to that shown in FIG. 2, FIG. 4 is a side view in section of a tip vessel embodiment alternative to the tip vessels shown in FIGS. 2 and 3, FIG. 5 is a side view in section of a tip vessel embodiment alternative to the tip vessels shown in FIGS. 2 to 4, and FIG. 6 shows how tip vessels in accordance with the invention are combined into a band or matrix.

FIG. 1 shows a 4-channel pipette. The handle part 4 comprises a mantle 10, a calibration nut 11, a secondary support 13, a knob shaft 14, a knob 15, a secondary spring 16 resting against the support 17 of the secondary support in the mantle 10. By turning the calibration nut 11 clockwise or anticlockwise, it is possible to adjust the stroke length of the knob shaft 14 so as to correspond a certain volume. The mantle 10 of the handle part 4 is fastened to the frame part 1 by means of threading 18. The frame part 1 includes a support disk 21 of the pistons 20, to which disk the shaft 22 is fastened. The shaft is forced to the upper position by the primary spring 23. The lower plate 24 of the pistons 20 is fastened to the support disk 21. The support springs 25 force the pistons 20 against the support disk 21. The pistons 20 can move to some extent in the lateral direction. The force of the support spring 25 of the pistons 20 is dimensioned so that it is higher than the friction force of the corresponding O-ring 19 of each piston 20. The pistons 20 travel in their own cylinder spaces 12. The cylinder space 12 is surrounded by a cylinder mantle 26, which extends to the tip cone 2. The O-ring 19 is supported against the end of the cylinder mantle 26 by the O-ring support 28 and by the support spring 29. The force of the support spring 29 is higher than the friction force produced by the O-ring 19 of the piston 20. The cylinder mantles 26 and the tip cones 2 constituting their extensions are fastened to the support plate 30, which is fastened to the frame part 1. Tip vessels 3 are connected with airtight joints to the tip cones 2 as their extensions. The tip vessels 3 are designed so that they can be connected to the tip cones 2 by means of friction joints. The bottom part of the tip vessel 3 has a little hole 31 for sucking the liquid to be pipetted into the tip vessel 3 and, correspondingly, for emptying the tip vessel 3 of the liquid contained therein. As is shown in FIG. 2, around the filling and emptying hole 31 of the tip vessel, a bottom portion 32 sloping sufficiently gently towards the filling and emptying hole of the tip vessel 3 has been formed. Then, owing to the effect of the bottom portion 32, as compared with conventional tapering tip vessels, the tip vessel 3 appears to be a vessel of a blunt tip and of uniform thickness. As is shown in FIG. 2, the bottom portion 32 of the tip vessel 3 may be part of the face of a cone, the tip angle of said cone being approximately 90°. In practice, the tip angle shall be larger than 60°.

FIG. 3 shows a tip vessel 3' alternative to the tip vessel 3 shown in FIG. 2, the bottom portion 33 of this vessel 3' having the shape of the face of a hemisphere.

The thickness of the bottom portion 32 of the tip vessel 3 at the hole 31 must not be excessive, but it should preferably be less than the wall thickness of the other parts of the tip vessel 3.

As shown in FIG. 4, a conically narrower short tip appendix 7 having a sharp tip and projecting downwards from the bottom portion has been formed on the bottom portion of the tip vessel 3'' underneath the bottom portion 6 of the tip vessel 3''. The filling and emptying hole 5 of the tip vessel 3'' remains inside the tip appendix 7, which hole is preferably a hole that becomes conically wider upwards.

The length of the tip appendix of the tip vessel 3'' is 1 to 5 mm, preferably 2 to 3 mm. On the upper surface of the bottom portion 6 of the tip vessel 3'', around the filling and emptying hole 5 of the tip vessel, an upwardly directed, preferably sharp-edged annular projection 8 has been formed. The annular projection 8 may also have additional nodules which facilitate the loosening of an air bubble and its rising to the liquid surface. Of course, the tip appendix 7, the hole 5, and the annular projection 8 may also be placed eccentrically in relation to the longitudinal axis of the tip vessel 3″.

In the embodiment shown in FIG. 5, the principle of the tip vessel is otherwise the same as in that shown in FIG. 4, but the annular projection 8′ of the tip vessel 3‴ together with its ridge 9 is formed out of the bottom portion 6′ of the tip vessel 3‴, which rises upwards towards the filling and emptying hole 5′ of the tip vessel.

Figure 6:
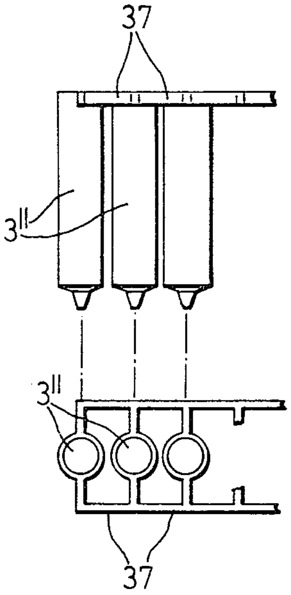

In the embodiment shown in FIG. 6, it is shown how the tip vessels in accordance with the invention can be combined into a band or matrix by means of flexible "bridges" 37.

The tip vessels 3 in accordance with the invention may be used either alone or in connection with a multichannel dosage pipette. In connection with a multichannel pipette, the tip vessels in accordance with the invention may be used as a line or matrix formation assembled into a tip vessel element.

The dosage pipette as shown in FIG. 1 works as follows: The stroke length b of the piston is divided into two parts, a and c, by means of a so-called secondary spring 16 and a secondary support 13. When the knob 15 of the pipette is pressed down all the way, the piston 20 moves through its entire stroke length b and fills the tip vessel 3 with the liquid taken. When the knob 15 is pressed down to the secondary support 16, the piston 20 moves only the part a of its entire stroke length b, e.g. 1/5 or 1/10. Thus, it is an essential feature of the operation of the pipette shown in FIG. 1 that in the present pipette the primary movement a is short and the secondary movement c long, whereas in entirely ordinary pipettes the primary movement is long and the secondary movement short. When the piston 20 of the pipette shown in FIG. 1 is pressed repeatedly the distance of its short primary movement a downwards, liquid 34 can be dosed from the tip 3 of the pipette as doses of equal magnitude into different test tubes. Between the doses, the piston 20 is restored to its upper position, whereby the piston 20 sucks air 35 through the pipette tip into the tip vessel. In the tip vessel the air rises as a bubble 35 of the size of the dose to the surface of the liquid column 34 and forms an extension to the air column 36 already existing in the vessel. Thus, the liquid 34 is after each dose restored to the bottom of the tip vessel 3 and a new dose is ready for pipetting.

The shape of the tip vessel has a decisive significance for the described functioning of the dosage pipette, for the substantially uniformly thick shape of the vessel permits the air bubbles to rise freely onto the liquid surface. Thus, the shape of the tip vessel of the pipette must be such that it permits the air to rise onto the liquid in the vessel when the piston is restored the distance of the primary movement a upwards. When liquid is being dosed, the liquid is particularly well loosened from the tapering tip appendix 7 without any drops adhering to the bottom end of the tip vessel 3 outside the vessel. The hole 5 in the tip appendix 7 preferably has the shape of a cone widening upwards, whereby it reduces the risk of jet formation of the liquid when the liquid is being sucked in.

Moreover, when liquid is being dosed by pumping movement of the pipette, the gliding of an air bubble to the side of the tip vessel 3 is prevented in the tip vessel in accordance with the invention by means of a ring 8 surrounding the upper end of the conical hole 5.

What we claim is:

1. A pipette tip vessel adapted for frictional connection to the outer conical surface of the tip cone of a pipette, said tip vessel including an outer cylindrical wall having first and second ends, said first end forming a first input opening which is adapted to frictionally engage the outer conical surface of said tip cone;

a first annular portion extending substantially inwardly from an area adjacent said second end of said cylindrical wall, said annular portion defining a second input aperture; and a frustoconical member having its base attached about the periphery of said second input aperture and extending outwardly therefrom with the apex end of said frustoconical member defining an output aperture, said base including a raised inwardly directed portion disposed about said second input aperture and extending into the interior of said tip vessel.

2. A pipette tip vessel as claimed in claim 1 in which said annular portion slopes downwardly from said outer cylindrical wall toward said second input aperture and in which said raised portion extends upwardly into the interior of said tip vessel from said annular portion.

3. A pipette vessel as claimed in claim 1, in which said annular portion slopes upwardly as it extends inwardly from said cylindrical wall toward said second input aperture.

4. A tip vessel as claimed in claim 1, in which said frustoconical portion is between 1 mm and 5 mm in length measured along an axis defined by the centers of said second input aperture and said output aperture.

* * * * *